J. W. DIEDERICH.
TRACTOR.
APPLICATION FILED AUG. 19, 1918.
1,342,427.
Patented June 8, 1920.
2 SHEETS—SHEET 1.
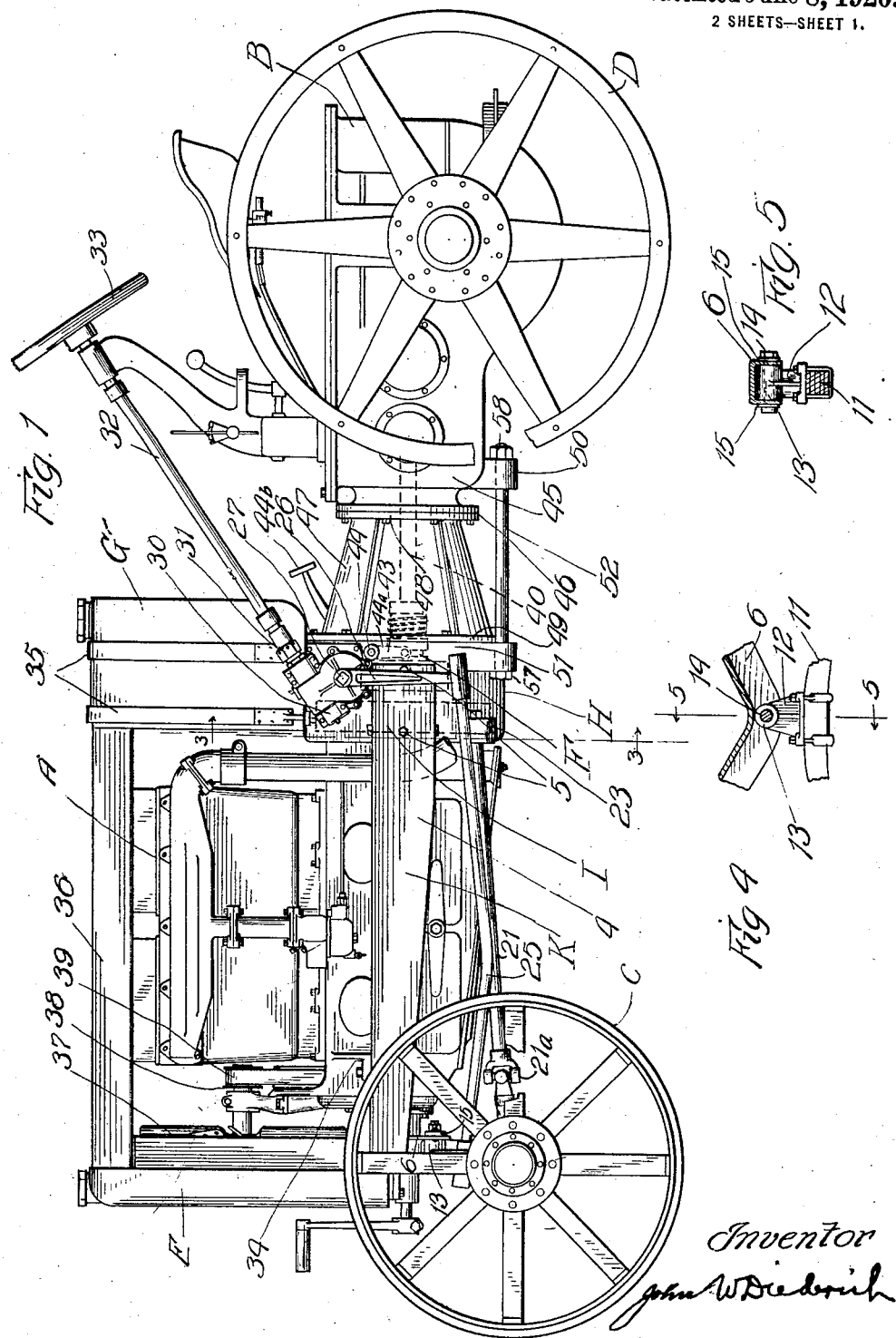

J. W. DIEDERICH.
TRACTOR.
APPLICATION FILED AUG. 19, 1918.
1,342,427.
Patented June 8, 1920.
2 SHEETS—SHEET 2.
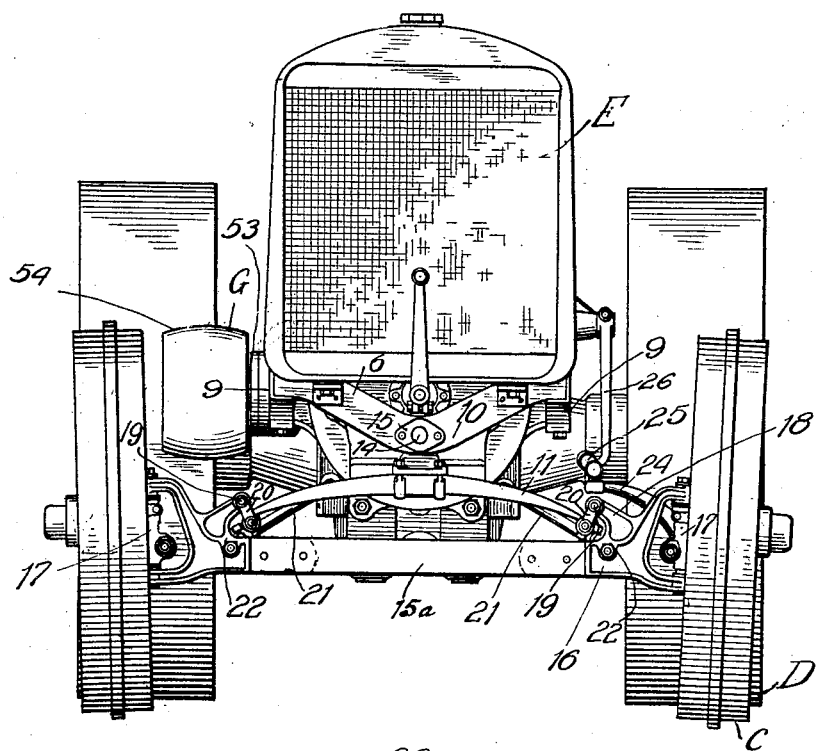
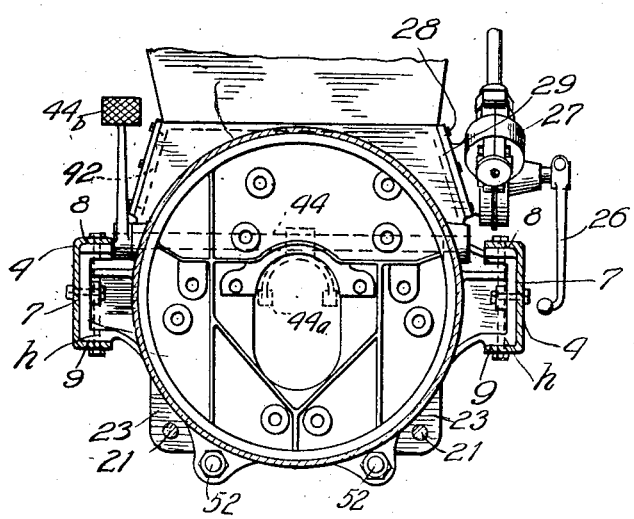
Inventor
John W Diederich

UNITED STATES PATENT OFFICE.

JOHN W. DIEDERICH, OF CLEVELAND, OHIO, ASSIGNOR TO THE CRAIG TRACTOR COMPANY, OF CLEVELAND, OHIO, A CORPORATION OF OHIO.

TRACTOR.

1,342,427. Specification of Letters Patent. Patented June 8, 1920.

Application filed August 19, 1918. Serial No. 250,457.

*To all whom it may concern:*

Be it known that I, JOHN W. DIEDERICH, a citizen of the United States, residing at Cleveland, in the county of Cuyahoga and State of Ohio, have invented certain new and useful Improvements in Tractors, of which the following is a specification.

The object of my invention is to provide a tractor which is inexpensive to build, contains a minimum of parts, is of simple construction and easy to assemble and take apart for purposes of repair and the like. In the tractor commonly found on the market a main frame extending the length of the machine carries the engine, clutch, transmission mechanism, etc., each of which is more or less independently mounted upon the frame. In my improved construction this main frame is dispensed with and the machine is built up or assembled of two main substructures, one of which is mounted on the front wheels and comprises the engine and its associated parts, and the other of which is mounted on the rear wheels and comprises the transmission, etc., means being provided for assembling and rigidly connecting the two members together so strongly that the common frame referred to above may be dispensed with. Other features and improvements will be understood from the drawings and the following detailed description, it being understood, however, that the specific disclosure is for the purpose of exemplification only, and that the scope of the invention is defined in the following claims in which I have endeavored to distinguish it from the prior art so far as known to me without, however, relinquishing or abandoning any portion or feature thereof.

Referring to the accompanying drawings, Figure 1 is a side elevation of a preferred form of tractor embodying my invention; Fig. 2 a front elevation thereof; Fig. 3 a transverse section on the line 3—3 of Fig. 1; Fig. 4 is a transverse vertical section of a detail; and Fig. 5 a longitudinal section of the same part on the line 5—5 of Fig. 4. The same reference character is applied to each element wherever it occurs throughout the several views.

For the purpose of the present invention the engine A, transmission B, power takeoff G, wheels C, D, radiator E, and clutch F, may be of any well known or approved type and it has therefore been considered unnecessary to illustrate them in detail. The engine, clutch, radiator, and fuel tank G' are all comprised within a forward unit which is mounted upon the wheels C, while the transmission, differential and associated parts are comprised in a rear unit mounted on the drive wheels D. In the particular form of the invention disclosed the power takeoff is mounted in a casing intermediate the bell housing and the transmission casing 47, though this is not essential to the invention. One of the characteristic features of the invention resides in the fact that the connection between the elements constituting the forward group or unit and the rear unit is through a bell-housing H which may contain the flywheel of the engine as indicated in dotted lines at I and the clutch F. The engine and the radiator are supported on a horizontal U-shaped frame K which comprises the side members 4—4 bolted at their rear ends 5—5 to the bell-housing, and a transverse member or beam 6 connecting the side members at their forward ends.

The bell-housing H is a casting in the shape of a short cylinder and is provided or formed with outwardly extending lugs h—h which, as shown in Fig. 3 at their outer ends are generally rectangular in cross section and present vertical faces 7—7 and horizontal upper and lower faces 8, 9, to which the side members of the frame, which are correspondingly shaped, may be bolted. The side members of the frame are channeled or U-shaped in cross section throughout, the hollow sides thereof being turned inwardly (see Fig. 3) to embrace the lugs on the bell-housing at their rear ends, and at the forward ends as at 9—9 Fig. 2 embrace the respective opposite ends of the transverse beam 6 and are securely bolted or otherwise secured thereto to form a rigid frame. Intermediate its ends, on which the radiator E rests, the transverse member 6 is depressed as at 10 and is pivoted at its apex to a spring 11 by which it is supported from the front axle. The specific construction of this pivotal mounting is shown in Figs. 4 and 5. The transverse beam is also U-shaped in cross section with the open side of the U downward and the bearing bracket 12 on the spring 11 extends into the open side and is formed at its upper end as at 13 with a bearing for pivot pin 14 which extends through the flanges of beam 6. The transverse beam is provided at this point with one or more reinforcing plates 15 in which the ends of the pin 14 also have bearing or are secured. By this manner of connecting the frame to the front axle the necessary relative tilt between the parts is provided.

In the particular embodiment of the invention shown the front axle comprises a beam 15ª the respective ends of which are riveted or otherwise secured to yokes 16 in which the journal members 17 of the wheels are pivoted in the usual or any desired manner. The yokes differ from the constructions commonly employed in that ears 18 are formed integral therewith to receive the pivots 19 by which links 20 for suspending the spring 11 are hung. By thus forming the ears for supporting the spring integral with the yokes a multiplication of parts is avoided.

In order to maintain the necessary relation between the front axle and the forward unit or assembly, I provide radius bars 21—21 which at their forward ends are attached to the yokes as at 22—22 and at the rear ends and at a slightly higher level are secured in lugs 23—23 cast upon the bell or casing. The radius rods are formed with universal joints at 21ª to permit the necessary tilting of the axle relative to the frame carried thereby. The forward wheels may be journaled in any desired manner on the bearings 17.

In order to provide for steering the machine the bearing 17 to the right, as seen in Fig. 2, may be formed with an arm 24 which is connected by a link 25 with an arm 26 on shaft 27. The latter is journaled in a bracket 28 which is bolted to the inclined shoulder 29 on the casing and covers the opening therein. Shaft 27 may be provided with the usual worm gear and a worm which may be of usual form is mounted on an inclined shaft 30 which has a universal joint 31 with the steering shaft 32 which carries the hand wheel 33. As there is nothing novel in the particular form of steering mechanism, it is not essential to describe it more in detail and other forms thereof than that chosen for illustration may be employed.

In the preferred form of the invention shown, the engine is supported from the frame K by lugs 34, but at its rear end is preferably supported directly from the bell-housing to which the crank case, which is made of suitable stiffness for the purpose, is directly bolted or secured. If desired the engine might be further supported at the rear from the sub-frame.

As seen more particularly in Fig. 3 the upper surface of the bell is preferably flattened to form a support for the fuel tank G which is strapped thereto by the straps 35. The top of the hood is shown at 36 and a fan which may be of any usual character at 37, the latter being driven from the crank shaft or otherwise by a pulley 38 and belt 39. This particular portion of the apparatus is or may be of such usual form as to need no further description.

As heretofore stated the bell housing H incloses the fly wheel of the engine and may also house the clutch between the crank shaft and the driving shaft 40 of the transmission mechanism. There is nothing novel in the clutch *per se* and it is shown as of a common type including a transverse shaft 44 journaled in the bell housing, and having within the housing a yoke 44ª for shifting the clutch, and on one end thereof a pedal arm 44ᵇ for operating the same. Any other form of clutch operating mechanism could obviously be employed. An inspection opening is provided at 42.

The transmission mechanism, which as indicated above may be of any suitable design, is inclosed in a transmission casing 45 the forward end of which is formed with a flange 46. An intermediate spacing member 47, which in the particular form of invention illustrated consists in a frusto-conical intermediate casing, is bolted at its rear end to the said flange on the transmission casing and at its front edge to the rear of the bell housing, the casing and housing being provided respectively with flanges 48, 49 for this purpose. This intermediate or spacing member in the particular construction shown serves also to receive and support the power takeoff G which, as commonly, comprises a shaft 53 geared to shaft 40 and a pulley 54. It is not essential for the purpose of this invention in its broader aspect that the spacing member 47 take the form of a casing or that it inclose the power takeoff which if desired may be otherwise located.

It has been found convenient to assemble the front and rear units separately and then bring them together with the intermediate spacing member between them to form the completed machine. It has been found difficult, however, by reason of the weight and the unwieldy character of the parts, and the nice adjustment required, to unite the front and rear units and insert the clutch shaft into the fly wheel bearing, which as usual supports one end of this shaft, and in order to facilitate this operation I have formed and provided the machine with the following parts. On the transmission housing are cast a pair of lugs 50—50 suitably spaced apart and underneath the forward end thereof and in a corresponding location but at the rear end of the bell housing I cast similar lugs 51—51. Preferably these lugs extend a substantial distance below the respective elements on which they are formed and the lugs on one element are perforated to register with openings formed in the corresponding lugs on the other element. In assembling the machine, rods of suitable length to provide the necessary longitudinal movement between the parts are inserted in the respective pairs of registering lugs after the parts have been brought approximately to their relative positions. These rods thereafter while maintaining the substantial alinement of the parts permit them to be shifted longitudinally until the shaft connections referred to above have been made and the forward and rear units have been connected by bolting or otherwise securing them to the intermediate spacing member or casing 47. After the parts are thus secured together the assembly rods heretofore described are withdrawn from the lugs 50, 51 and replaced by stout tension rods 52 the ends of which are threaded and receive nuts 57, 58 by which tension is put on said rods so that they take up the strain tending to break the back of the machine. If desired the casing 47 and its connections to the bell housing and transmission casing respectively may be made only strong enough to support the thrust and such tension as may be put upon it during assembly, the tension rods receiving the entire tensile stress after they have been adjusted. Preferably, however, the casing 47 and its connections to the transmission casing and housing respectively are made of such strength as to materially assist in resisting the strain. It will be observed that the tension rods, bell H and the radius rods together form the tension members of a truss, the compression members of which comprise the crank case frame bell housing, intermediate casing and transmission casing.

My invention provides a strong, rigid framework of simple construction and design which dispenses with the complete framing formerly considered essential without sacrificing strength or convenience. It is also capable of being readily assembled and taken apart without special apparatus for the purpose other than the guide or assembly rods heretofore described.

I claim:

1. In a tractor a front and rear unit, the front unit comprising an engine and a pair of supporting wheels and a housing from which the engine is supported, the rear unit comprising a pair of wheels and a transmission mechanism having a casing, connections for driving the mechanism from the engine, a spacing member intermediate the housing and the transmission casing, and tension rods directly connecting the housing and transmission mechanism casing below the spacing member.

2. In a tractor a front unit and a rear unit, the front unit comprising an engine and a pair of wheels and a housing from which the engine is supported, the rear unit comprising a pair of wheels and a transmission mechanism having a casing, connections for driving the transmission mechanism from the engine, a connecting casing intermediate said housing and casings, lugs upon and beneath the housing and transmission casings respectively, tension rods connecting the lugs and means for adjusting the tension of said rods.

3. In a tractor a front and a rear unit, the front unit comprising an engine and a pair of wheels and a bell housing, a flywheel and clutch within the casing connected to the engine, the rear unit comprising a pair of wheels and a transmission mechanism having a casing, connections for driving the transmission mechanism from the engine, a casing intermediate the transmission casing and the bell casing and tension rods beneath the last said casing and connecting the housing and transmission casing.

4. In a tractor a front unit comprising an engine having a crank case, a pair of supporting wheels and a bell housing rigidly connected to the crank case of the engine, a rear unit comprising a pair of wheels and a transmission casing mounted thereon, a casing intermediate the bell housing and transmission casing and bolted thereto, lugs extending downwardly from the bell housing and transmission casing respectively and tension rods connecting said lugs.

5. In a tractor, and engine, a bell housing to which the engine is rigidly attached, a pair of wheels for supporting the front of the engine, a connecting casing bolted to the rear of the bell housing, a power take-off therein, a transmission mechanism, a casing inclosing said mechanism, ground wheels upon which the transmission casing is supported, tension rods connecting the bell housing and the transmission casings, an axle connecting the front wheels and radius rods connecting the axle and the bell casing.

JOHN W. DIEDERICH.